(12) United States Patent
Ohashi et al.

(10) Patent No.: US 10,357,744 B2
(45) Date of Patent: Jul. 23, 2019

(54) EXHAUST GAS PURIFICATION DEVICE (71) Applicant: CATALER CORPORATION, Kakegawa-shi, Shizuoka (JP)

(72) Inventors: Tatsuya Ohashi, Kakegawa (JP); Shingo Sakagami, Kakegawa (JP); Tsuyoshi Ito, Kakegawa (JP); Ryota Onoe, Kakegawa (JP); Naoto Miyoshi, Toyota (JP); Masahiko Takeuchi, Toyota (JP); Akemi Sato, Toyota (JP)

(73) Assignee: CATALER CORPORATION, Kakegawa (JP)

( * ) Notice: Subject to any disclaimer, the term of this patent is extended or adjusted under 35 U.S.C. 154(b) by 148 days.

(21) Appl. No.: 15/515,830

(22) PCT Filed: Oct. 6, 2015

(86) PCT No.: PCT/JP2015/078410
§ 371 (c)(1),
(2) Date: Mar. 30, 2017

(87) PCT Pub. No.: WO2016/056573
PCT Pub. Date: Apr. 14, 2016

(65) Prior Publication Data
US 2017/0296969 A1    Oct. 19, 2017

Related U.S. Application Data

(63) Continuation of application No. PCT/JP2015/078410, filed on Oct. 6, 2015.

(30) Foreign Application Priority Data

Oct. 9, 2014  (JP) ................................. 2014-208151
Jul. 8, 2015  (JP) ................................. 2015-136905

(51) Int. Cl.
*F01N 3/28* (2006.01)
*B01D 53/94* (2006.01)
(Continued)

(52) U.S. Cl.
CPC ......... *B01D 53/9472* (2013.01); *B01D 53/94* (2013.01); *B01D 53/945* (2013.01);
(Continued)

(58) Field of Classification Search
CPC ........ B01D 53/9472; B01D 2255/9032; B01D 2255/905; F01N 2510/0682
See application file for complete search history.

(56) References Cited

U.S. PATENT DOCUMENTS 8,815,189 B2   8/2014  Arnold et al.
2006/0057046 A1  3/2006  Punke et al.
(Continued)

FOREIGN PATENT DOCUMENTS

CN  102006922 A   4/2011
CN  102421526 A   4/2012
(Continued)

OTHER PUBLICATIONS

Machine translation of JP2007185571A, accessed Nov. 15, 2018.*
(Continued)

*Primary Examiner* — Jonathan R Matthias
(74) *Attorney, Agent, or Firm* — Oliff PLC (57) ABSTRACT

An exhaust gas purification device of the present invention is provided with: a substrate of wall flow structure having an inlet cell, an outlet cell and a porous partition wall; an upstream catalyst layer, provided inside the partition wall and disposed in an upstream portion of the substrate including an exhaust gas inflow end section; and a downstream catalyst layer, provided inside the partition wall and disposed in a downstream portion of the substrate including an
(Continued)

exhaust gas outflow end section. The upstream catalyst layer and the downstream catalyst layer each contain a carrier and at least one noble metal from among Pt, Pd and Rh, supported on the carrier. The noble metal in the upstream catalyst layer and the noble metal in the downstream catalyst layer are different from each other.

7 Claims, 6 Drawing Sheets

(51) Int. Cl.
*F01N 13/00* (2010.01)
*B01J 23/63* (2006.01)
*B01J 35/00* (2006.01)
*B01J 35/04* (2006.01)
*F01N 3/035* (2006.01)
*B01J 37/02* (2006.01)
*B01J 23/40* (2006.01)

(52) U.S. Cl.
CPC ........ *B01D 53/9454* (2013.01); *B01J 23/40* (2013.01); *B01J 23/63* (2013.01); *B01J 35/0006* (2013.01); *B01J 35/04* (2013.01); *B01J 37/0244* (2013.01); *F01N 3/035* (2013.01); *F01N 3/28* (2013.01); *F01N 13/009* (2014.06); *B01D 2255/1021* (2013.01); *B01D 2255/1023* (2013.01); *B01D 2255/1025* (2013.01); *B01D 2255/905* (2013.01); *B01D 2255/9032* (2013.01); *B01D 2255/9155* (2013.01); *F01N 2330/06* (2013.01); *F01N 2370/02* (2013.01); *F01N 2510/0682* (2013.01); *Y02T 10/22* (2013.01)

(56) References Cited

U.S. PATENT DOCUMENTS

| | | | |
|---|---|---|---|
| 2009/0087365 A1 | 4/2009 | Klingmann et al. | |
| 2009/0247396 A1 | 10/2009 | Mizutani | |
| 2011/0030346 A1 | 2/2011 | Neubauer et al. | |
| 2012/0040824 A1 | 2/2012 | Itou et al. | |
| 2012/0288427 A1 | 11/2012 | Grubert et al. | |
| 2013/0236687 A1 | 9/2013 | Hirose et al. | |

FOREIGN PATENT DOCUMENTS

| | | |
|---|---|---|
| CN | 102574056 A | 7/2012 |
| EP | 1710009 A1 | 10/2006 |
| JP | 2003-278526 A | 10/2003 |
| JP | 2004-346902 A | 12/2004 |
| JP | 2006272288 A | 10/2006 |
| JP | 2007-185571 A | 7/2007 |
| JP | 2008-513189 A | 5/2008 |
| JP | 2009-082915 A | 4/2009 |
| JP | 2009-165922 A | 7/2009 |
| JP | 2009-226376 A | 10/2009 |
| JP | 2009-247931 A | 10/2009 |
| JP | 2010-269205 A | 12/2010 |
| JP | 2013-500857 A | 1/2013 |
| JP | 2013-212500 A | 10/2013 |
| JP | 2014-100669 A | 6/2014 |
| WO | 2006/031600 A1 | 3/2006 |
| WO | 2009/102683 A1 | 8/2009 |
| WO | 2011/015615 A1 | 2/2011 |
| WO | 2012/156883 A1 | 11/2012 |

OTHER PUBLICATIONS

Dec. 1, 2015 International Search Report issued in International Patent Application No. PCT/JP2015/078410.

Sep. 27, 2017 Search Report issued in European Patent Application No. 15848560.7.

Jan. 11, 2019 Office Action Issued in Chinese Patent Application No. 201580054598.5.

Apr. 18, 2019 Office Action Issued in Japanese Patent Application No. 2015-136905.

* cited by examiner

EXHAUST GAS PURIFICATION DEVICE

TECHNICAL FIELD

The present invention relates to an exhaust gas purification device. More particularly, the present invention relates to an exhaust gas purification device that purifies exhaust gas emitted by an internal combustion engine such as a gasoline engine.

The present application claims priority based on Japanese Patent Application No. 2014-208151, filed on Oct. 9, 2014, and Japanese Patent Application No. 2015-136905, filed on Jul. 8, 2015, the entire contents whereof are incorporated in the present description by reference.

BACKGROUND ART

Generally, exhaust gas emitted by internal combustion engines contains particulate matter (PM) having carbon as a main component, as well as ash made up of unburned components, which are known to give rise to air pollution. Regulations concerning emissions of particulate matter have therefore become stricter year after year, alongside regulations on harmful components in exhaust gas such as hydrocarbons (HC), carbon monoxide (CO), nitrogen oxides (NOx), and the like. In this respect, various technologies for trapping and removing such particulate matter from exhaust gas have been proposed.

For instance, particulate filters for trapping such particulate matter are provided in the exhaust passage of internal combustion engines. In gasoline engines, for example, a certain amount of particulate matter, though smaller than that in diesel engines, is emitted together with exhaust gas, and a gasoline particulate filter (GPF) may in some cases be fitted in the exhaust passage. Such particulate filters include known filters having a structure, referred to as a wall flow type, in which a substrate is configured of multiple cells made up of a porous substance, and in which the inlets and the outlets of the multiple cells are plugged alternately (Patent Literature 1 and 2). In a wall flow-type particulate filter, exhaust gas that flows in through cell inlets passes through partitioning porous cell partition walls, and is discharged out through the cell outlets. As the exhaust gas passes through a porous cell partition wall, the particulate matter is trapped within the pores inside the partition wall.

CITATION LIST

Patent Literature

Patent Literature 1: Japanese Patent Application Publication No. 2007-185571
Patent Literature 2: Japanese Patent Application Publication No. 2009-82915

SUMMARY OF INVENTION

Approaches involving supporting a noble metal catalyst on the above particulate filters have been studied in recent years with a view to further increasing purification performance. For instance, Patent Literature 1 discloses an exhaust gas purification catalyst in which platinum (Pt) and rhodium (Rh) as noble metal catalysts are supported separately inside a partition wall. Further, Patent Literature 2 discloses an exhaust gas purification catalyst in which a layer of palladium (Pd) as a noble metal catalyst is disposed inside a partition wall, and a rhodium (Rh) layer is laid on the surface of the partition wall.

In the exhaust gas purification catalyst of Patent Literature 1, however, Pt and Rh co-exist inside the partition wall, and hence sintering (grain bonding) between Pt and Rh occurs when the catalyst is exposed to high temperature. The purification performance on exhaust gas may drop as a result. In the exhaust gas purification catalyst of Patent Literature 2, Pd and Rh are disposed inside and outside the partition wall, respectively, and thus sintering between Pd and Rh can be suppressed. The Rh layer is disposed outside the partition wall, however, and thus exhaust gas does not flow readily, and there is a greater loss of pressure (hereafter also referred to as pressure loss), which is disadvantageous. Conventional configurations have thus left room for improvement as regards combining enhanced purification performance with reductions in pressure loss.

It is a main object of the present invention, arrived at in the light of the above considerations, to provide an exhaust gas purification device having a particulate filter of a wall-flow structure type in which purification performance on exhaust gas can be enhanced while reducing pressure loss.

Solution to Problem

The exhaust gas purification device according to the present invention is an exhaust gas purification device which is disposed in an exhaust passage of an internal combustion engine and which purifies exhaust gas emitted by the internal combustion engine. The device is provided with: a substrate of wall flow structure having an inlet cell in which only an exhaust gas inflow end section is open, an outlet cell adjacent to the inlet cell and in which only an exhaust gas outflow end section is open, and a porous partition wall that partitions the inlet cell and the outlet cell from each other; an upstream catalyst layer provided inside the partition wall; and a downstream catalyst layer provided inside the partition wall. The upstream catalyst layer is disposed in an upstream portion of the substrate, in the direction of exhaust gas flow, including the exhaust gas inflow end section. The downstream catalyst layer is disposed in a downstream portion of the substrate, in the direction of exhaust gas flow, including the exhaust gas outflow end section. The upstream catalyst layer and the downstream catalyst layer each contain a carrier and at least one noble metal from among platinum (Pt), palladium (Pd) and rhodium (Rh), supported on the carrier. The noble metal contained in the upstream catalyst layer and the noble metal contained in the downstream catalyst layer are different from each other.

In the present description, the feature "noble metals being different from each other" between the upstream catalyst layer and the downstream catalyst layer signifies that the types of noble metal contained in the catalyst layers are different, and signifies also that the combinations of noble metals contained in the respective layers are different. Therefore, the wording "noble metals being different" can encompass herein instances where for example, the noble metal of the upstream catalyst layer is Rh and the noble metal of the downstream catalyst layer is Rh and Pd, the noble metal of the upstream catalyst layer is Rh and the noble metal of the downstream catalyst layer is Rh and Pt, the noble metal of the upstream catalyst layer is Pd and the noble metal of the downstream catalyst layer is Pd and Rh, or an instance where the noble metal of the upstream catalyst layer is Pt, and the noble metal of the downstream catalyst layer is Pt and Rh.

By virtue of the above exhaust gas purification device, it becomes possible to provide providing an exhaust gas purification device boasting significantly enhanced purification performance on exhaust gas, while reducing pressure loss.

In a preferred aspect of the exhaust gas purification device disclosed herein, the coating amount of the upstream catalyst layer per L of volume of the substrate is smaller than the coating amount of the downstream catalyst layer per L of volume of the substrate. By setting thus the coating amount of the upstream catalyst layer to be smaller than the coating amount of the downstream catalyst layer, the exhaust gas flows preferentially in the upstream portion of the partition wall. As a result, the flow of exhaust gas from the inlet cell up to the outlet cell becomes smoother, and pressure loss can be further reduced. In a preferred aspect, the coating amount of the upstream catalyst layer per L of volume of the substrate is 60 g/L to less than 99.9 g/L. The above-described effect can be brought out yet better when the coating amount upstream catalyst layer lies within the above range.

In a preferred aspect of the exhaust gas purification device disclosed herein, the upstream catalyst layer is formed in a portion corresponding to 20% to 80% of the length of the substrate, from the exhaust gas inflow end section of the substrate towards the downstream side. Further, the downstream catalyst layer is formed in a portion corresponding to 20% to 80% of the length of the substrate, from an exhaust gas outflow end section of the substrate towards the upstream side. Within these ranges of the lengths of the upstream catalyst layer and of the downstream catalyst layer, it becomes possible to achieve a greater degree of enhancement of purification performance and reduction in pressure loss.

In a preferred aspect of the exhaust gas purification device disclosed herein, the upstream catalyst layer contains Rh as the noble metal, and the downstream catalyst layer contains Pt and/or Pd as the noble metal. By virtue of the above configuration, harmful components in the exhaust gas can be purified efficiently all at once, and exhaust gas purification performance can be further enhanced.

In a preferred aspect of the exhaust gas purification device disclosed herein, in the thickness direction of the partition wall the upstream catalyst layer is unevenly distributed within the partition wall, so as to be in contact with the inlet cell and not in contact with the outlet cell; and the downstream catalyst layer is unevenly distributed within the partition wall, so as to be in contact with the outlet cell and not in contact with the inlet cell. In such a configuration, a plurality of noble metals (for instance, Pt and Rh) is supported separately in the thickness direction of the partition wall, and hence sintering of the noble metals to each other is suppressed more effectively. Further, the noble metals are disposed densely within the partition wall, and hence contact between the noble metals and the exhaust gas is good. Purification performance on exhaust gas can be further enhanced as a result.

In a preferred aspect of the exhaust gas purification device disclosed herein, the upstream catalyst layer is formed in a portion corresponding to 30% to 70% of the thickness of the partition wall, from the surface of the partition wall in contact with the inlet cell towards the outlet cell. Further, the downstream catalyst layer is formed in a portion corresponding to 30% to 70% of the thickness of the partition wall, from the surface of the partition wall in contact with the outlet cell towards the inlet cell. Within these ranges of the thickness of the upstream catalyst layer and of the downstream catalyst layer, it becomes possible to achieve a greater degree of enhancement of purification performance and reduction in pressure loss.

In a preferred aspect of the exhaust gas purification device disclosed herein, the internal combustion engine is a gasoline engine. The temperature of exhaust gas in gasoline engines is comparatively high, and PM does not deposit readily inside the partition wall. Accordingly, the above-described effect can be brought out more efficiently in a case where the internal combustion engine is a gasoline engine.

DESCRIPTION OF EMBODIMENTS

Preferred embodiments of the present invention will be explained below on the basis of drawings. Any features other than the features specifically set forth in the present description and which may be necessary for carrying out the present invention (for instance, general features pertaining to the arrangement of particulate filters in automobiles) can be regarded as instances of design matter for a person skilled in the art on the basis of known techniques in the technical field in question. The invention can be realized on the basis of the disclosure of the present description and common technical knowledge in the relevant technical field.

Figure 1:
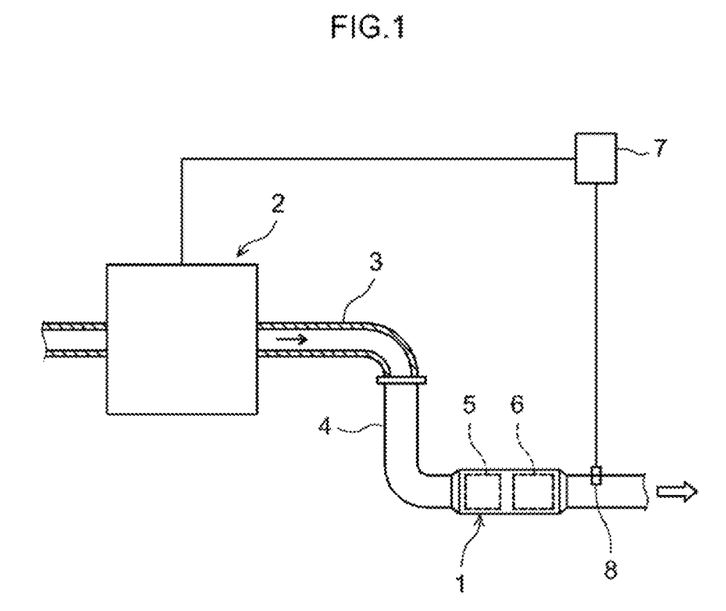
FIG. 1 is a diagram illustrating schematically an exhaust gas purification device according to an embodiment.

The configuration of an exhaust gas purification device according to an embodiment of the present invention will be explained first with reference to FIG. 1. An exhaust gas purification device 1 disclosed herein is provided in an exhaust system of the above internal combustion engine. FIG. 1 is a diagram illustrating schematically an internal combustion engine 2 and the exhaust gas purification device 1 that is provided in the exhaust system of the internal combustion engine 2.

An air-fuel mixture containing oxygen and fuel gas is supplied to the internal combustion engine (engine) according to the present embodiment. In the internal combustion engine the air-fuel mixture is burned, and the combustion energy is converted to mechanical energy. The burned air-fuel mixture becomes exhaust gas that is discharged to the exhaust system. The internal combustion engine 2 having the structure illustrated in FIG. 1 is configured mainly as a gasoline engine of an automobile.

The exhaust system of the engine 2 will be explained next. An exhaust manifold 3 is connected to an exhaust port (not shown) through which the engine 2 communicates with the exhaust system. The exhaust manifold 3 is connected to an exhaust pipe 4 through which exhaust gas flows. An exhaust passage of the present embodiment is formed by the exhaust manifold 3 and the exhaust pipe 4. The arrows in the figure denote the flow direction of the exhaust gas.

The exhaust gas purification device 1 disclosed herein is provided in the exhaust system of the engine 2. The exhaust gas purification device 1, which is equipped with a catalyst unit 5, a filter unit 6 and an ECU 7, purifies harmful components (for instance, carbon monoxide (CO), hydrocarbons (HC) and nitrogen oxides ($NO_x$)) contained in the exhaust gas that is emitted, and traps particulate matter (PM) contained in the exhaust gas.

The ECU 7 is a unit that carries out control between the engine 2 and the exhaust gas purification device 1, and has, as a constituent element, an electronic device such as a digital computer, similarly to common control devices. Typically, the ECU 7 is provided with an input port electrically connected to sensors (for instance, a pressure sensor 8) that are disposed at respective locations in the engine 2 and/or the exhaust gas purification device 1. Thereby, information detected at the respective sensors is transmitted via the input port to the ECU 7 in the form of electrical signals. The ECU 7 is also provided with an output port. The ECU 7, which is connected via the output port to respective sites of the engine 2 and of the exhaust gas purification device 1, controls the operation of the various members through transmission of control signals.

The catalyst unit 5, which is configured to be capable of purifying three-way components ($NO_x$, HC and CO) contained in the exhaust gas, is provided in the exhaust pipe 4 that communicates with the engine 2. Specifically, the catalyst unit 5 is provided downstream of the exhaust pipe 4, as illustrated in FIG. 1. The type of the catalyst unit 5 is not particularly limited. The catalyst unit 5 may be for instance a catalyst that supports a noble metal such as platinum (Pt), palladium (Pd) or rhodium (Rd). A downstream catalyst unit may be further disposed in the exhaust pipe 4, downstream of the filter unit 6. The specific configuration of the catalyst unit 5 is not a characterizing feature of the present invention, and will not be explained in detail herein.

The filter unit 6 is provided downstream of the catalyst unit 5. The filter unit 6 has a gasoline particulate filter (GPF) capable of trapping and removing particulate matter (hereafter, "PM" for short) present in the exhaust gas. The particulate filter according to the present embodiment will be explained below in detail.

Figure 2:
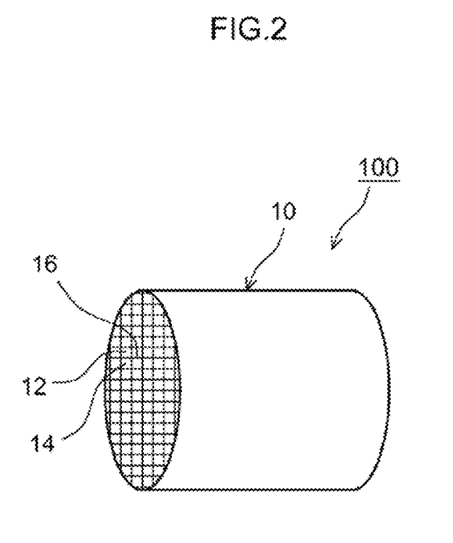
FIG. 2 is a perspective-view diagram illustrating schematically a filter of an exhaust gas purification device according to an embodiment.
Figure 3:
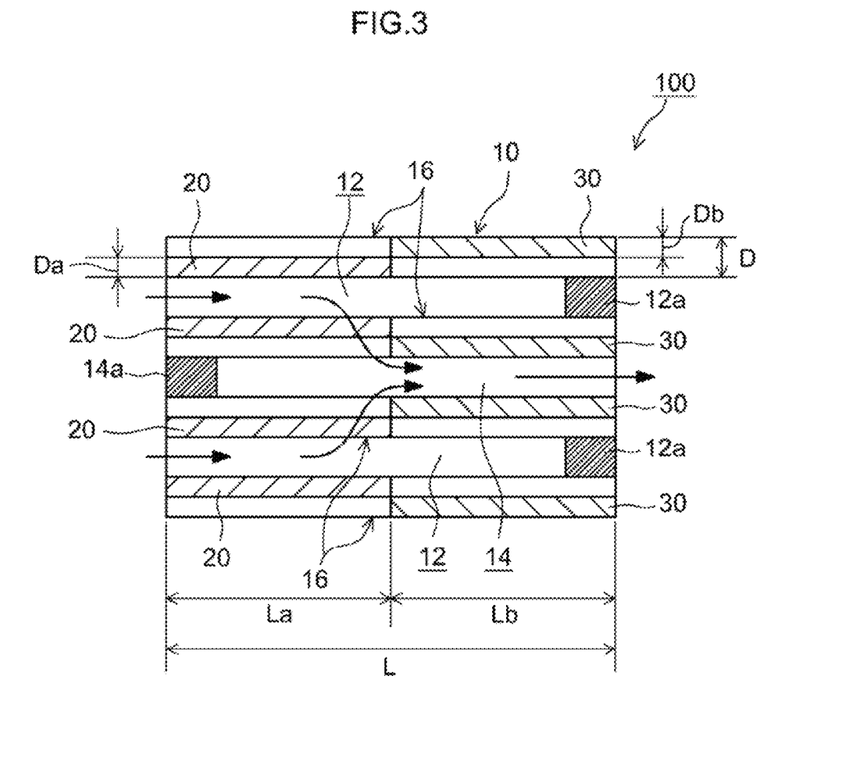
FIG. 3 is a cross-sectional diagram illustrating schematically a filter cross-section of an exhaust gas purification device according to an embodiment.

FIG. 2 is a perspective-view diagram of a particulate filter 100. FIG. 3 is a schematic diagram of an enlargement of part of a cross-section of the particulate filter 100, cut in the axial direction. As illustrated in FIG. 2 and FIG. 3, the particulate filter 100 is provided with a substrate 10 having a wall flow structure, an upstream catalyst layer 20 and a downstream catalyst layer 30. The substrate 10, the upstream catalyst layer 20 and the downstream catalyst layer 30 will be explained next in this order.

<Substrate 10>

As the substrate 10, there can be used conventional substrates of various materials and forms that are used in this kind of applications. For instance, substrates formed out of a ceramic such as cordierite or silicon carbide (SiC), or out of an alloy (stainless steel or the like), can be suitably used herein. Illustrative examples include substrates having a cylindrical outer shape (the present embodiment). However, an elliptic cylinder shape or polygonal cylinder shape may be adopted, instead of a cylinder, as the outer shape of the substrate as a whole. The substrate 10 has inlet cells 12 in which only an exhaust gas inflow end section is open, outlet cells 14 each of which is adjacent to each inlet cell 12 and in which only an exhaust gas outflow end section is open, and a porous partition wall 16 that partitions the inlet cell 12 and the outlet cell 14 from each other.

<Inlet Cells 12 and Outlet Cells 14>

In the inlet cells 12, only the exhaust gas inflow end section is open. In the outlet cells 14, which are adjacent to the inlet cells 12, only the exhaust gas outflow end section is open. In the present embodiment, the exhaust gas outflow end section of the inlet cells 12 is plugged by a sealing section 12a, and the exhaust gas inflow end section of the outlet cells 14 is plugged by a sealing section 14a. The inlet cells 12 and the outlet cells 14 may be set to have an appropriate shape and size taking into consideration the flow rate and components of the exhaust gas that is supplied to the filter 100. For instance, the inlet cells 12 and the outlet cells 14 may adopt various geometrical shapes, for example a rectangular shape including squares, parallelograms, rectangles and trapezoids, and also triangular and other polygonal shapes (for instance, hexagons and octagons), as well as circular shapes.

<Partition Wall 16>

The partition wall 16 is formed between the inlet cell 12 and the outlet cell 14 that are adjacent to each other. The inlet cells 12 and the outlet cells 14 are partitioned by the partition wall 16. The partition wall 16 has a porous structure that allows exhaust gas to pass therethrough. The porosity of the partition wall 16 is not particularly limited, but is appropriately set to about 50% to 70%, and is preferably 55% to 65%. When the porosity of the partition wall 16 is excessively low, PM may slip therethrough; when by contrast the porosity of the partition wall 16 is excessively high, the mechanical strength of the filter 100 tends to drop, all of which is undesirable. The thickness of the partition wall 16 is not particularly limited, but may be of about 200 μm to 800 μm. Within such a range of partition wall thickness, it becomes possible to achieve the effect of suppressing increases in pressure loss without compromising PM trapping efficiency.

<Upstream Catalyst Layer 20>

As illustrated in FIG. 3, the upstream catalyst layer 20 is provided inside the partition wall 16. The upstream catalyst layer 20 is disposed in an upstream portion of the substrate 10 including the exhaust gas inflow end section. The upstream catalyst layer 20 is provided with a carrier (not shown) and a noble metal (not shown) that is supported on the carrier.

In the present embodiment, the upstream catalyst layer 20 is formed in a portion (½L) corresponding to 50% of the length L of the substrate 10, from the exhaust gas inflow end section of the substrate 10 towards the downstream side. The upstream catalyst layer 20 is unevenly distributed within the partition wall 16 in such a manner that the upstream catalyst layer 20 is in contact with the inlet cells 12 and not in contact with the outlet cells 14, in the thickness direction of the partition wall 16. In the present embodiment, the upstream catalyst layer 20 is formed in a portion (½D) corresponding to 50% of the thickness D of the partition wall 16 from the surface of the partition wall 16 in contact with the inlet cells 12 towards the outlet cells 14.

The upstream catalyst layer 20 may contain one or two noble metals from among any of platinum (Pt), palladium (Pd) and rhodium (Rh). In the present embodiment, the upstream catalyst layer 20 contains Rh as a noble metal. The amount of Rh per L of volume of substrate is preferably about 0.05 g to 0.2 g (preferably 0.1 g to 0.15 g). The catalytic activity obtained from Rh can be insufficient when the amount of Rh is excessively small. An excessive carrying amount of Rh, on the other hand, is disadvantageous in terms of cost and a likelier occurrence of Rh grain growth. The upstream catalyst layer 20 may contain a noble metal other than Rh, Pt or Pd. Examples of the noble metal other than Rh, Pt or Pd that can be used include for instance ruthenium (Ru), iridium (Ir) and osmium (Os).

The upstream catalyst layer 20 is formed by supporting Rh on a carrier. Examples of such carriers include metal oxides such as alumina ($Al_2O_3$), zirconia ($ZrO_2$), ceria ($CeO_2$), silica ($SiO_2$), magnesia (MgO), titanium oxide (titania: $TiO_2$), and solid solutions of the foregoing (for instance, a ceria-zirconia ($CeO_2$—$ZrO_2$) complex oxide). Alumina is preferably used among the foregoing. Two or more types of the above carriers may be used concomitantly. Other materials (typically inorganic oxides) may be added, as an auxiliary component, to the carrier. Rare earth elements such as lanthanum (La) and yttrium (Y), alkaline earth elements such as calcium, as well as other transition metal elements can be used herein as substances that can be added to the carrier. Among the foregoing, rare earth elements such as lanthanum and yttrium allow increasing the specific surface area at high temperature without impairing catalytic function, and hence are suitably used as stabilizers.

The shape (outer shape) of the carrier is not particularly limited, but the carrier is preferably powdery, from the viewpoint of securing a yet greater specific surface area. For instance, the average particle size of the carrier (average particle size measured by laser diffraction-scattering) is preferably 8 μm or smaller (for instance, 4 μm to 7 μm). An excessively large average particle size of the carrier is undesirable since in that case the dispersibility of the noble metal supported on the carrier tends to drop, and the purification performance of the catalyst to decrease. On the other hand, an excessively small average particle size of the carrier is undesirable since in that case there decreases the heat resistance of a carrier itself made up of the above carrier, and the heat resistance characteristic of the catalyst decreases as a result. Hence, it is preferable to use ordinarily a carrier having an average particle size of about 3 μm or greater (for instance, 4 μm or greater).

The method for supporting Rh on the carrier is not particularly limited, and a Rh-supporting carrier may be prepared for instance by impregnating the carrier with an aqueous solution that contains a Rh salt (for instance, a nitrate) or a Rh complex (for instance, a tetraammine complex), followed by drying and firing.

Besides the above-described carrier having Rh supported thereon, an auxiliary catalyst supporting no noble metal can be added to the upstream catalyst layer 20 disclosed herein. Examples of the auxiliary catalyst include ceria-zirconia ($CeO_2$—$ZrO_2$) complex oxides and silica ($SiO_2$). Using a ceria-zirconia complex oxide is particularly preferred herein. Ordinarily, the content of the auxiliary catalyst with respect to 100 mass % as the total of Rh, carrier plus the auxiliary catalyst is appropriately of 20 mass % to 80 mass %, and is preferably for instance of 30 mass % to 70 mass %.

The upstream catalyst layer 20 can be formed by coating the interior of the partition wall 16 with a slurry (typically through suction coating of the slurry under reduced pressure) that contains a powder resulting from supporting Rh on the carrier, and the above metal oxide powder. In the process of forming the upstream catalyst layer 20 by coating, a binder may be incorporated into the slurry in order to properly bring the latter into close contact with the interior of the partition wall 16. For instance alumina sol or silica sol is preferably used as the binder. The viscosity of the slurry may be adjusted as appropriate so as to allow the slurry to flow easily into the partition wall 16 of the substrate 10. The inflow amount of the slurry may be adjusted as appropriate in accordance with the volume of the substrate 10 and the coating amount of the upstream catalyst layer 20, in such a manner that the injected slurry dwells properly inside the partition wall 16 of the substrate 10.

<Downstream Catalyst Layer 30>

The downstream catalyst layer 30 is provided inside the partition wall 16. The downstream catalyst layer 30 is disposed in a downstream portion of the substrate 10 including the exhaust gas outflow end section. The downstream catalyst layer 30 is provided with a carrier (not shown) and a noble metal (not shown) that is supported on the carrier.

In the present embodiment, the downstream catalyst layer 30 is formed in a portion (½L) corresponding to 50% of the length L of the substrate 10, from the exhaust gas outflow end section of the substrate 10 towards the upstream side. The downstream catalyst layer 30 is unevenly distributed within the partition wall 16 in such a manner that the downstream catalyst layer 30 is in contact with the outlet cells 14 and not in contact with the inlet cells 12, in the thickness direction of the partition wall 16. In the present embodiment, the downstream catalyst layer 30 is formed in a portion (½D) corresponding to 50% of the thickness D of the partition wall 16 from the surface of the partition wall 16 in contact with the outlet cells 14 towards the inlet cells 12.

The noble metal contained in the downstream catalyst layer 30 is different from the noble metal contained in the upstream catalyst layer 20. In the present embodiment, the downstream catalyst layer 30 contains a noble metal other than the noble metal (herein, Rh) contained in the upstream catalyst layer 20, from among Pt, Pd and Rh. In the present embodiment, the downstream catalyst layer 30 contains Pt as the noble metal. The amount of Pt per L of volume of substrate is preferably about 0.1 g to 2 g (preferably 0.5 g to 1 g). The catalytic activity obtained from Pt is insufficient when the carrying amount of Pt is excessively small. An excessive carrying amount of Pt, on the other hand, is disadvantageous in terms of cost and a likelier occurrence of grain growth of the noble metal. The downstream catalyst layer 30 may contain a noble metal other than Rh, Pt or Pd. Examples of the noble metal other than Rh, Pt or Pd that can be used include for instance ruthenium (Ru), iridium (Ir) and osmium (Os).

The downstream catalyst layer 30 is formed by supporting Pt on a carrier. Examples of such carriers include for instance metal oxides such as alumina ($Al_2O_3$), zirconia ($ZrO_2$), ceria ($CeO_2$), silica ($SiO_2$), magnesia (MgO), titanium oxide (titania: $TiO_2$), and solid solutions of the foregoing (for instance, a ceria-zirconia ($CeO_2$—$ZrO_2$) complex oxide). Using a ceria-zirconia complex oxide is particularly preferred herein. Two or more types of the above carriers may be used concomitantly. Other materials (typically inorganic oxides) may be added, as an auxiliary component, to the carrier. Rare earth elements such as lanthanum (La) and yttrium (Y), alkaline earth elements such as calcium, as well as other transition metal elements can be used herein as substances that can be added to the carrier. Among the foregoing, rare earth elements such as lanthanum and yttrium allow increasing the specific surface area at high temperature without impairing catalytic function, and hence are suitably used as stabilizers.

The shape (outer shape) of the carrier is not particularly limited, but the carrier is preferably powdery, from the viewpoint of securing a yet greater specific surface area. For instance, the average particle size of the carrier (average particle size measured by laser diffraction-scattering) is preferably 8 µm or smaller (for instance, 4 µm to 7 µm). An excessively large average particle size of the carrier is undesirable since in that case the dispersibility of the noble metal supported on the carrier tends to drop, and the purification performance of the catalyst to decrease. On the other hand, an excessively small average particle size of the carrier is undesirable since in that case there decreases the heat resistance of a carrier itself made up of the above carrier, and the heat resistance characteristic of the catalyst decreases as a result. Hence, it is preferable to use ordinarily a carrier having an average particle size of about 3 µm or greater (for instance, 4 µm or greater).

The method for supporting Pt on the carrier is not particularly limited, and a Pt-supporting carrier can be prepared for instance by impregnating the carrier with an aqueous solution that contains a Pt salt (for instance, a nitrate) or a Pt complex (for instance, a tetraammine complex), followed by drying and firing.

Besides the above-described carrier having Pt supported thereon, an auxiliary catalyst supporting no noble metal can be added to the downstream catalyst layer 30 disclosed herein. Examples of the auxiliary catalyst include alumina and silica ($SiO_2$). Ordinarily, the content of the auxiliary catalyst with respect to 100 mass % as the total of Pt, carrier plus the auxiliary catalyst (for instance, alumina) is appropriately of 20 mass % to 80 mass %, and is preferably for instance of 30 mass % to 70 mass %.

Barium may be added to the downstream catalyst layer 30 disclosed herein. Poisoning of the noble metal is suppressed, and catalytic activity enhanced, through addition of barium. Increased noble metal dispersibility entails better inhibition of sintering that accompanies grain growth in the noble metal at high temperature. The durability of the catalyst can be enhanced as a result. The addition amount of barium in the downstream catalyst layer 30 disclosed herein satisfies preferably 10 mass % to 15 mass %, and particularly preferably satisfies 12 mass % to 15 mass %, with respect to the total mass of the downstream catalyst layer 30 excluding the barium (i.e. total of Pt, carrier and metal oxide particles). The downstream catalyst layer 30 having barium added thereto can be produced for instance by preparing a barium aqueous solution in which a water-soluble barium salt (for instance, barium sulfate) is dissolved in water (typically deionized water), and adding then the resulting barium aqueous solution to a carrier or the like, followed by firing.

The downstream catalyst layer 30 can be formed by coating the interior of the partition wall 16 with a slurry (typically through suction coating of the slurry under reduced pressure) that contains a powder resulting from supporting Pt on the carrier, and the above metal oxide powder. In the process of forming the downstream catalyst layer 30 by coating, a binder may be incorporated into the slurry in order to properly bring the latter into close contact with the interior of the partition wall 16. For instance alumina sol or silica sol is preferably used as the binder. The viscosity of the slurry may be adjusted as appropriate so as to allow the slurry to flow easily into the partition wall 16 of the substrate 10. The inflow amount of the slurry may be adjusted as appropriate in accordance with the volume of the substrate 10 and the coating amount of the downstream catalyst layer 30, in such a manner that the injected slurry dwells properly inside the partition wall 16 of the substrate 10.

In this particulate filter 100, exhaust gas flows in through the inlet cells 12 of the substrate 10, as illustrated in FIG. 3. The exhaust gas having flowed in through the inlet cells 12 passes through the porous partition wall 16 and reaches the outlet cells 14. The arrows in FIG. 3 denote the route along which the exhaust gas that flows in through the inlet cells 12 reaches the outlet cells 14 by traversing the partition wall 16. The partition wall 16 has a porous structure; as the exhaust gas passes through the partition wall 16, therefore, the PM becomes trapped at the surface of the partition wall 16 and in the pores inside the partition wall 16. The upstream catalyst layer 20 and the downstream catalyst layer 30 are provided inside the partition wall 16, and hence harmful components in the exhaust gas are purified as the exhaust gas passes through the interior of and over the surface of the partition wall 16. The exhaust gas that has reached the outlet cells 14 through the partition wall 16 is discharged out of the filter 100 through the opening on the exhaust gas outflow side.

In such a particulate filter 100, sintering (grain bonding) between Pt and Rh is effectively suppressed since Pt and Rh are supported separately between the upstream portion (upstream catalyst layer 20) and the downstream portion (downstream catalyst layer 30) of the substrate 10. As a result, degradation of the catalyst is suppressed also when the latter is exposed to high temperature. Both the upstream catalyst layer 20 and the downstream catalyst layer 30 are disposed inside the partition wall 16, and hence the exhaust gas flows more readily than in the case where the catalyst layers 20 and 30 are formed on the surface (outside) the partition wall 16. Flow path resistance is lowered as a result, and pressure can be reduced thereby. The present configuration allows therefore providing a particulate filter 100 boasting significantly enhanced purification performance on exhaust gas, while reducing pressure loss, and providing also an exhaust gas purification device 1 that is provided with the particulate filter 100.

In the present description, the wording "catalyst layer disposed inside the partition wall" signifies that the catalyst layer is present mainly not outside the partition wall (typically, the surface), but mainly in the interior of the partition wall. More specifically, for instance the cross-section of the partition wall of the upstream catalyst layer is observed under an electronic microscope, and the total coating amount in a range of length of 1/10 the length L (0.1L) of the substrate from the exhaust gas inflow end section towards the downstream side is set to 100%. In this case, the above wording signifies that the coating amount fraction that is present inside the partition wall is typically 80% or higher, for instance 85% or higher, preferably 90% or higher, and further 95% or higher, being in particular substantially 100%. This is therefore clearly distinguished from an instance where, for example part of the catalyst layer, when arranged on the surface of the partition wall, penetrates unintentionally into the latter.

The upstream catalyst layer 20 may be formed in a portion corresponding to 20% to 80% (preferably, 50% to 70%, i.e. ½ to 7/10 of the substrate as a whole) of the length L of the substrate 10, from the exhaust gas inflow end section of the substrate 10 towards the downstream side. The downstream catalyst layer 30 may be formed in a portion corresponding to 20% to 80% (preferably, 30% to 50% i.e. 3/10 to ½ of the substrate as a whole) of the length L of the substrate 10, from the exhaust gas outflow end section of the substrate 10 towards the upstream side. In this case, preferably, the downstream catalyst layer 30 is formed in a portion other than the upstream catalyst layer 20, in the length direction (extension direction of the partition wall 16) of the substrate 10. For instance, there holds preferably La=0.2L to 0.8L, Lb=0.2L to 0.8L and La+Lb=L, where L is the total length of the substrate 10, La is the total length of the upstream catalyst layer 20 and Lb is e total length of the downstream catalyst layer 30. Within these ranges of the lengths La and Lb of the upstream catalyst layer 20 and of the downstream catalyst layer 30, it becomes possible to achieve a greater degree of enhancement of purification performance and reduction in pressure loss.

In the present embodiment, the upstream catalyst layer 20 is unevenly distributed within the partition wall 16, so as to be in contact with the inlet cells 12 and not in contact with the outlet cells 14, in the thickness direction of the partition wall 16. The downstream catalyst layer 30 is unevenly distributed within the partition wall 16 so as be in contact with the outlet cells 14 and not in contact with the inlet cells 12. In such a configuration, Rh and Pt are supported separately in the thickness direction of the partition wall 16, and hence it becomes possible to suppress effectively sintering between Rh and Pt (and suppress therefore catalyst degradation). Contact between the exhaust gas and Rh and Pt is good since Rh and Pt are disposed densely within the partition wall 16. Purification performance on exhaust gas can be further enhanced as a result.

In this case, the upstream catalyst layer 20 may be formed in a portion corresponding to 30% to 100% of the thickness D of the partition wall 16 from the surface of the partition wall 16 in contact with the inlet cells 12 towards the outlet cells 14 (for instance, over 30% to 70%, preferably 30% to 80%, more preferably 40% to 80%, i.e. ⅖ to ⅘ of the thickness of the partition wall). The downstream catalyst layer 30 may be formed in a portion corresponding to 30% to 100% of the thickness D of the partition wall 16 from the surface of the partition wall 16 in contact with the outlet cells 14 towards the inlet cells 12 (for instance, over 30% to 70%, preferably 30% to 80%, more preferably 40% to 80% i.e. ⅖ to ⅘ of the thickness of the partition wall). In this case, the downstream catalyst layer 30 is preferably formed so as not to overlap the upstream catalyst layer 20 in the thickness direction of the partition wall 16. For instance, there holds preferably Da=0.3D to 1.0D, Db=0.3D to 1.0D and Da+Db D, where D is the thickness of the partition wall 16, Da is the thickness of the upstream catalyst layer 20, and Db is the thickness of the downstream catalyst layer 30. Within these ranges of the thickness Da and Db of the upstream catalyst layer 20 and of the downstream catalyst layer 30, it becomes possible to achieve a greater degree of enhancement of purification performance and reduction in pressure loss.

The coating amount of the upstream catalyst layer 20 per L of volume of substrate may be smaller than the coating amount of the downstream catalyst layer 30 per L of volume of substrate. By setting thus the coating amount of the upstream catalyst layer 20 to be smaller than the coating amount of the downstream catalyst layer 30, the exhaust gas flows preferentially in the upstream portion of the partition wall 16. As a result, the flow of exhaust gas from the inlet cells 12 up to the outlet cells 14 becomes smoother, and pressure loss can be further reduced. In a preferred implementation, the coating amount of the upstream catalyst layer 20 per L of volume of substrate may be about 60 g/L to less than 100 g/L, and is preferably 60 g/L to 80 g/L, and more preferably 65 g/L to 75 g/L (for instance, 70 g/L), from the viewpoint of reducing pressure loss.

The coating amount of the downstream catalyst layer 30 per L of volume of substrate may be about 100 g/L to less than 140 g/L, and is preferably 120 g/L to 140 g/L, more preferably 125 g/L to 135 g/L (for instance, 130 g/L).

In a preferred implementation, there holds the following relationship 60≤X<Y≤140, where X g/L denotes the coating amount of the upstream catalyst layer 20 per L of volume of substrate and Y g/L denotes the coating amount of the downstream catalyst layer 30 per L of volume of substrate.

TEST EXAMPLE 1

Test examples pertaining to the present invention will be explained next, but the invention is not meant to be limited to the test examples illustrated below.
<Sample 1>

Herein alumina as a carrier for upstream catalyst layer formation was prepared and was impregnated with a Rh nitrate solution as a noble metal catalyst solution, followed by evaporation to dryness, to prepare a Rh/alumina carrier powder supporting 0.8 mass % of Rh. A slurry for upstream catalyst layer formation was then prepared through mixing of 36.9 parts by mass of the Rh/alumina carrier powder, 36.61 parts by mass of a ceria-zirconia complex oxide, and deionized water. Next the slurry was applied through suction onto a portion of a cordierite substrate (wall flow-type substrate illustrated in FIG. 2 and FIG. 3: diameter 103 mm, total length 100 mm) corresponding to 50% of the length L of the substrate from the exhaust gas inflow end section towards the downstream side, and onto a portion corresponding to 50% of the thickness of the partition wall 16 from the surface of the partition wall 16 in contact with the inlet cells 12 towards the outlet cells 14, followed by drying and firing, to form the upstream catalyst layer 20 in the interior of the partition wall 16. The mass of the upstream catalyst layer per L of volume of substrate was set to 34.65 g, and the mass of Rh per L of volume of substrate was set to 0.1313 g. In Sample 1 the coating amount of the upstream catalyst layer per L of volume of substrate was set to 70 g/L.

Herein a ceria-zirconia complex oxide as a carrier for downstream catalyst layer formation was prepared and was impregnated with a Pt nitrate solution as a noble metal catalyst solution, followed by evaporation to dryness, to prepare a Pt/ceria-zirconia complex oxide carrier powder supporting 1.91 mass % of Pt. A slurry for downstream catalyst layer formation was prepared by mixing 62.2 parts by mass of the Pt/ceria-zirconia complex oxide carrier powder, 36.61 parts by mass of alumina, 18.32 parts by mass of $BaSO_4$, and deionized water. Next the slurry was applied through suction onto a portion of the above substrate corresponding to 50% of the length L of the substrate from the exhaust gas outflow end section towards the upstream side, and onto a portion corresponding to 50% of the thickness of the partition wall 16 from the surface of the partition wall 16 in contact with the outlet cells 14 towards the inlet cells 12, followed by drying and firing, to form the downstream catalyst layer 30 in the interior of the partition wall 16. The mass of the downstream catalyst layer per L of volume of substrate was set to 52.85 g, and the mass of Pt per L of volume of substrate was set to 0.5251 g. In Sample 1 the coating amount of the downstream catalyst layer per L of volume of substrate was set to 130 g/L. A particulate filter provided with the upstream catalyst layer 20 and the downstream catalyst layer 30 was thus obtained.

<Sample 2>

A particulate filter was produced in the same way as in Sample 1, but herein the coating amount of the upstream catalyst layer per L of volume of substrate was modified to 40 g/L and the coating amount of the downstream catalyst layer per L of volume of substrate to 160 g/L.

<Sample 3>

A particulate filter was produced in the same way as in Sample 1, but herein the coating amount of the upstream catalyst layer per L of volume of substrate was modified to 60 g/L and the coating amount of the downstream catalyst layer per L of volume of substrate to 140 g/L.

<Sample 4>

A particulate filter was produced in the same way as in Sample 1, but herein the coating amount of the upstream catalyst layer per L of volume of substrate was modified to 80 g/L and the coating amount of the downstream catalyst layer per L of volume of substrate to 120 g/L.

<Sample 5>

A particulate filter was produced in the same way as in Sample 1, but herein the coating amount of the upstream catalyst layer per L of volume of substrate was modified to 99 g/L and the coating amount of the downstream catalyst layer per L of volume of substrate to 101 g/L.

<Sample 6>

A particulate filter was produced in the same way as in Sample 1, but herein the coating amount of the upstream catalyst layer per L of volume of substrate was modified to 120 g/L and the coating amount of the downstream catalyst layer per L of volume of substrate to 80 g/L.

<Sample 7>

A particulate filter was produced that contained Pd in the upstream catalyst layer and Rh in the downstream catalyst layer. Specifically, a ceria-zirconia complex oxide as a carrier for upstream catalyst layer formation was prepared and impregnated with a Pd nitrate solution as a noble metal catalyst solution, followed by evaporation to dryness to prepare a Pd/ceria-zirconia complex oxide carrier powder supporting 1.91 mass % of Pd. A slurry for upstream catalyst layer formation was then prepared by mixing 62.2 parts by mass of the Pd/ceria-zirconia complex oxide carrier powder, 36.61 parts by mass of alumina, 18.32 parts by mass of BaSO$_4$, and deionized water. This slurry for upstream catalyst layer formation was applied onto the upstream portion of the substrate, and the Rh-containing slurry for upstream catalyst layer formation used in Sample 1 was applied onto the downstream portion of the substrate, to produce a particulate filter containing Pd in the upstream catalyst layer and containing Rh in the downstream catalyst layer. The coating amount of the upstream catalyst layer per L of volume of substrate was set to 70 g/L and the coating amount of the downstream catalyst layer per L of volume of substrate was set to 130 g/L.

<Sample 8>

For comparison, there was produced an exhaust gas purification device in which a mixed catalyst layer of Pt and Rh was formed uniformly in the substrate as a whole. Specifically, a slurry for mixed catalyst layer formation was prepared through mixing of 36.9 parts by mass of a Rh/alumina carrier powder, 36.61 parts by mass of a ceria-zirconia complex oxide, 62.2 parts by mass of a Pt/ceria-zirconia complex oxide carrier powder, 36.61 parts by mass of alumina, 18.32 parts by mass of BaSO$_4$, and deionized water. Next the entire substrate was dip-coated with this slurry, followed by drying and firing, to uniformly form as a result a mixed catalyst layer inside the partition wall. The condition of mass of Pt and Rh per L of volume of substrate was set to be identical to that of Sample 1.

Figure 4:
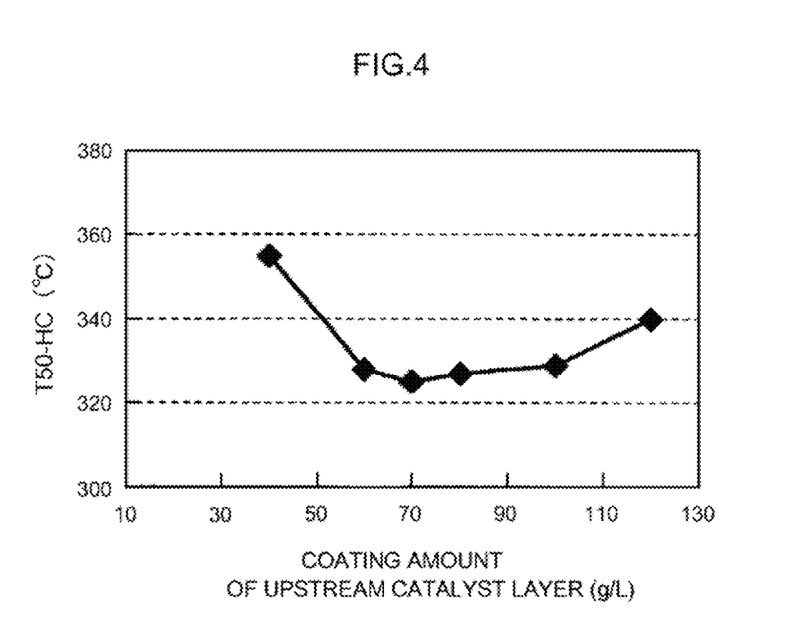
FIG. 4 is a graph illustrating the relationship between the coating amount of an upstream catalyst layer and HC 50% purification temperature.

In each particulate filter of Samples 1 to 8, the purification rate of HC gas during a rise in temperature from 100° C. to 600° C. (rate of temperature rise 20° C./minute) was measured continuously, so as to measure a 50% purification temperature. The 50% purification temperature denotes herein the gas temperature at the catalyst inlet at the time where the purification rate of HC gas reaches 50%. The results are given in Table 1 and FIG. 4. FIG. 4 is a graph illustrating the relationship between the proportion of the upstream catalyst layer with respect to the total coating amount and the 50% purification temperature in Samples 1 to 7.

Figure 5:
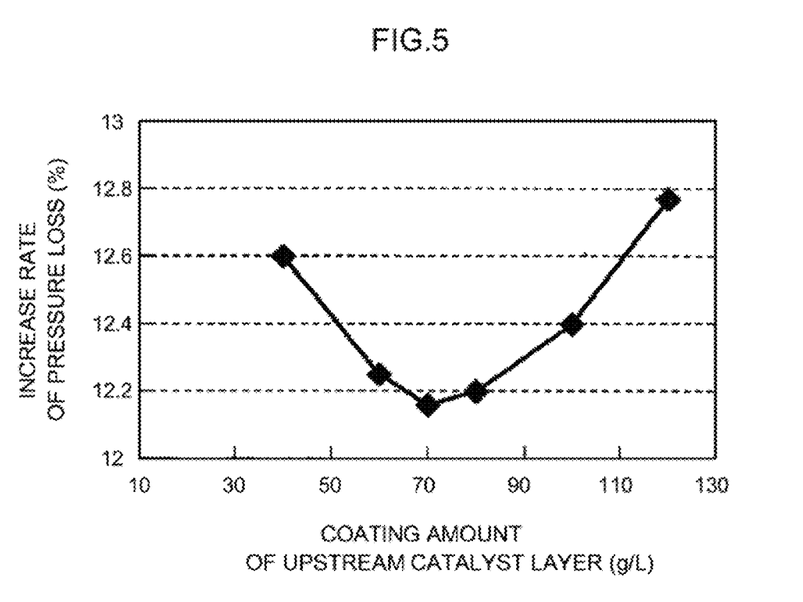
FIG. 5 is a graph illustrating the relationship between the coating amount of an upstream catalyst layer and an increase rate of pressure loss.

Exhaust gas was caused to flow through the particulate filters of Samples 1 to 7, under identical conditions, and pressure loss was measured. Specifically, the particulate filter of each sample was attached to the exhaust system of a gasoline engine, and the engine was operated in a steady state, to elicit flow of exhaust gas. Pressure sensors were attached before and after the particulate filter, and the difference in the measured values of the two pressure sensors was taken as the pressure loss. The same test was conducted in a particulate filter (reference example) in which no upstream catalyst layer or downstream catalyst layer was formed. The results illustrated in FIG. 5. FIG. 5 illustrates the increase rate of pressure loss of each sample referred to the pressure loss (100) of the reference example.

TABLE 1

| | Coating amount of upstream catalyst layer (g/L) | HC 50% purification temperature (° C.) | Increase rate of pressure loss (%) |
|---|---|---|---|
| Sample 1 | 70 | 325 | 12.16 |
| Sample 2 | 40 | 355 | 12.6 |
| Sample 3 | 60 | 328 | 12.25 |
| Sample 4 | 80 | 327 | 12.2 |
| Sample 5 | 99 | 329 | 12.4 |
| Sample 6 | 120 | 340 | 12.77 |
| Sample 7 | 70 | 350 | — |
| Sample 8 | — | 390 | — |

As Table 1 reveals, the 50% purification temperature of HC exceeded 390° C. in Sample 8, where a mixed catalyst layer of Pt and Rh was uniformly formed throughout the substrate. By contrast, Samples 1 to 6 in which Rh was disposed in the upstream catalyst layer and Pt was disposed in the downstream catalyst layer, as well as Sample 7 in which Pd was disposed in the upstream catalyst layer and Rh was disposed in the downstream catalyst layer, exhibited a lower 50% purification temperature of HC and better catalytic activity than those of Sample 8. A comparison between Samples 1 to 7 in FIG. 4 reveals that in particular a very low 50% purification temperature, of 330° C. or lower, can be achieved (Samples 1 and 3 to 5) by prescribing the coating amount of the upstream catalyst layer to be 60 g/L to less than 100 g/L. The coating amount of the upstream catalyst layer is thus preferably set to lie in the range of 60 g/L to less than 100 g/L (in particular, 60 g/L to 80 g/L) from the viewpoint of enhancing purification performance.

The increase rate of pressure loss varied with varying coating amount of the upstream catalyst layer, as illustrated in FIG. 5. In the tested exhaust gas purification devices a very low increase rate of pressure loss, not higher than of 12.25% (samples 1, 3 and 4), was achieved by prescribing the coating amount of the upstream catalyst layer to be 60 g/L to 80 g/L. The coating amount of the upstream catalyst layer is preferably set to 60 g/L to 80 g/L from the viewpoint of reducing pressure loss.

TEST EXAMPLE 2

The test below was performed in order to check the influence exerted on pressure loss by increases and decreases in the upstream catalyst layer inside the partition wall. Specifically, particulate filters were produced having dissimilar ratios of the upstream catalyst layer present inside the partition wall and of the upstream catalyst layer present outside (surface) of the partition wall. The coating amount of total upstream catalyst layer was set to be constant, at 70 g/L.

Figure 6:
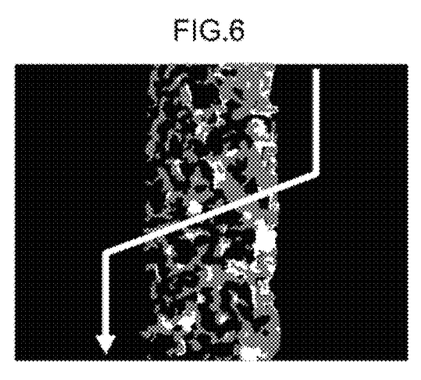
FIG. 6 is a cross-sectional SEM image of a partition wall of Sample 1.
Figure 7:
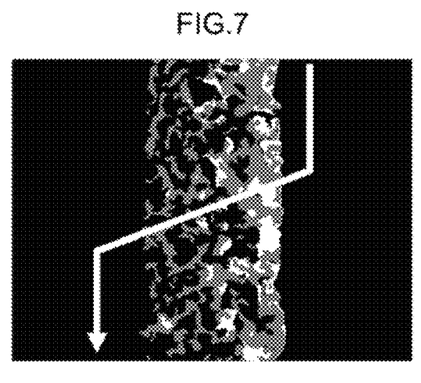
FIG. 7 is a cross-sectional SEM image of a partition wall of Sample 12.
Figure 8:
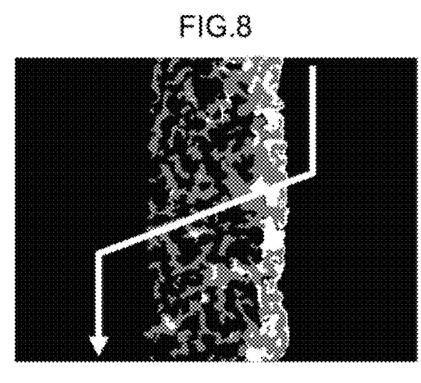
FIG. 8 is a cross-sectional SEM image of a partition wall of Sample 13.

In Sample 1, as described above, the upstream catalyst layer is disposed only inside the partition wall. That is, taking the total coating amount of upstream catalyst layer as 100%, as given in Table 2, then the coating amount fraction present inside the partition wall is 100%. In Sample 12, by contrast, the ratio of coating amount inside and outside the partition wall was adjusted so that the coating amount fraction present inside the partition wall was 96% and the coating amount fraction present outside the partition wall was 4%, by modifying the conditions of the slurry and so forth. In Sample 13 the ratio of coating amount inside and outside the partition wall was adjusted so that the coating amount fraction present inside the partition wall was 88% and the coating amount fraction outside the partition wall was 12%. The above coating amount ratio was grasped by observing a cross-section of the partition wall of the upstream catalyst layer under an electronic microscope (SEM), as illustrated in FIG. 6 to FIG. 8, and measuring the coating amount within a range of 0.1 L from the exhaust gas inflow end section towards the downstream side. FIG. 6 is a cross-sectional SEM image of the partition wall of Sample 1, FIG. 7 is a cross-sectional SEM image of the partition wall of Sample 12, and FIG. 8 is a cross-sectional SEM image of the partition wall of Sample 13. The arrows in the figures denote the flow of exhaust gas (gas flow).

Pressure loss in the particulate filters of Samples 12 and 13 was measured in accordance with the same procedure as that of Samples 1 to 11 described above. The results are given in Table 2.

TABLE 2

| | Coating amount of upstream catalyst layer | | | |
| --- | --- | --- | --- | --- |
| | Coating amount (g/L) | Inside partition wall (%) | Outside partition wall (%) | Increase rate of pressure loss (%) |
| Sample 1 | 70 | 100 | 0 | 12.16 |
| Sample 12 | 70 | 96 | 4 | 12.99 |
| Sample 13 | 70 | 88 | 12 | 15.01 |

Table 2 reveals a trend whereby pressure loss decreases with increasing ratio of the coating amount inside the partition wall (with decreasing ratio of the coating amount outside the partition wall), for a constant total coating amount of upstream catalyst layer. These results indicate that good exhaust gas flow and a reduction in pressure loss can be achieved by arranging the catalyst layer inside the partition wall. From the viewpoint of reducing pressure loss, the coating amount fraction present inside the partition wall is preferably 85% or higher, more preferably 95% or higher, and is particularly preferably 100%, taking the total coating amount of the catalyst layers as 100%.

Several variations of the particulate filter 100 and of the exhaust gas purification device 1 provided with the particulate filter 100 have been illustrated above, but the structure of the particulate filter 100 and of the exhaust gas purification device 1 is not limited to any one of the embodiments described above.

In the embodiments described above, for instance, Rh is disposed in the upstream catalyst layer 20 and Pt is disposed in the downstream catalyst layer 30, but the embodiments are not limited thereto. For instance, Pt may be disposed in the upstream catalyst layer 20 and Rh in the downstream catalyst layer 30. Further, Pd may be incorporated instead of Pt, or along with Pt, in the catalyst layers.

The shape and structure of the various members and sites of the exhaust gas purification device 1 may be modified. In the example illustrated in FIG. 1, the catalyst unit is provided upstream of the filter unit, but the catalyst unit may be omitted. The exhaust gas purification device 1 is particularly suitable as a device for purifying harmful components in exhaust gas having a comparatively high exhaust temperature, for instance in gasoline engines. However, the exhaust gas purification device 1 according to the present invention is not limited to being used to purify harmful components in exhaust gas of gasoline engines, and can be used in various applications that involve purifying harmful components in exhaust gas emitted by other engines (for instance, diesel engines).

INDUSTRIAL APPLICABILITY

The present invention allows providing an exhaust gas purification device in which purification performance on exhaust gas can be enhanced while reducing pressure loss.

The invention claimed is:

1. An exhaust gas purification device, the device comprising:
a substrate of wall flow structure having an inlet cell in which only an exhaust gas inflow end section is open, an outlet cell adjacent to the inlet cell and in which only an exhaust gas outflow end section is open, and a porous partition wall that partitions said inlet cell and said outlet cell from each other;
an upstream catalyst layer provided inside said partition wall and disposed in an upstream portion of said substrate, in a direction of exhaust gas flow, including the exhaust gas inflow end section; and
a downstream catalyst layer provided inside said partition wall and disposed in a downstream portion of said substrate, in a direction of exhaust gas flow, including the exhaust gas outflow end section; wherein
said upstream catalyst layer is formed in a portion corresponding to 20% to 80% of a length of said substrate, from the exhaust gas inflow end section of said substrate towards a downstream side, and
said downstream catalyst layer is formed in a portion corresponding to 20% to 80% of a length of said substrate, from an exhaust gas outflow end section of said substrate towards an upstream side,
with 100% as a total coating amount of said upstream catalyst layer and said downstream catalyst layer, a proportion of the coating amount present inside said partition wall is 85% or higher;

said upstream catalyst layer and said downstream catalyst layer each contain a carrier and at least one noble metal from among Pt, Pd and Rh, supported on the carrier; and the noble metal comprised in said upstream catalyst layer and the noble metal comprised in said downstream catalyst layer are different from each other.

2. The exhaust gas purification device of claim 1,
wherein the coating amount of said upstream catalyst layer per L of volume of said substrate is smaller than the coating amount of said downstream catalyst layer per L of volume of said substrate.

3. The exhaust gas purification device of claim 1,
wherein the coating amount of said upstream catalyst layer per L of volume of said substrate is an amount in the range of from 60 g/L to 100 g/L.

4. The exhaust gas purification device of claim 1,
wherein said upstream catalyst layer comprises Rh as said noble metal, and
said downstream catalyst layer comprises Pt and/or Pd as said noble metal.

5. The exhaust gas purification device of claim 1,
wherein in the thickness direction of said partition wall,
said upstream catalyst layer is unevenly distributed within said partition wall, so as to be in contact with said inlet cell and not in contact with said outlet cell, and
said downstream catalyst layer is unevenly distributed within said partition wall, so as to be in contact with said outlet cell and not in contact with said inlet cell.

6. The exhaust gas purification device of claim 5,
wherein said upstream catalyst layer is formed in a portion corresponding to 30% to 70% of the thickness of said partition wall, from a surface of said partition wall in contact with said inlet cell towards the outlet cell, and
said downstream catalyst layer is formed in a portion corresponding to 30% to 70% of the thickness of said partition wall, from a surface of said partition wall in contact with said outlet cell towards the inlet cell.

7. An internal combustion engine comprising the exhaust gas purification device of claim 1 disposed in an exhaust passage of said internal combustion engine, wherein said internal combustion engine is a gasoline engine.

* * * * *